US012633538B2

(12) United States Patent
Wang et al.

(10) Patent No.: US 12,633,538 B2
(45) Date of Patent: May 19, 2026

(54) HIGH-CONDUCTIVITY SULFUR-BASED POSITIVE ELECTRODE MATERIAL FOR SECONDARY BATTERY AND SECONDARY BATTERY

(71) Applicant: SHANGHAI JIAO TONG UNIVERSITY, Shanghai (CN)

(72) Inventors: Jiulin Wang, Shanghai (CN); Jingyu Lei, Shanghai (CN); Huichao Lu, Shanghai (CN); Jun Yang, Shanghai (CN)

(73) Assignee: SHANGHAI JIAO TONG UNIVERSITY, Shanghai (CN)

( * ) Notice: Subject to any disclaimer, the term of this patent is extended or adjusted under 35 U.S.C. 154(b) by 501 days.

(21) Appl. No.: 18/283,458

(22) PCT Filed: Mar. 2, 2022

(86) PCT No.: PCT/CN2022/078703
§ 371 (c)(1),
(2) Date: Sep. 22, 2023

(87) PCT Pub. No.: WO2023/040206
PCT Pub. Date: Mar. 23, 2023

(65) Prior Publication Data
US 2024/0170668 A1     May 23, 2024

(30) Foreign Application Priority Data

Sep. 15, 2021   (CN) .......................... 202111081775.2

(51) Int. Cl.
*H01M 4/58*        (2010.01)
*C08F 20/44*       (2006.01)
(Continued)

(52) U.S. Cl.
CPC .......... *H01M 4/5815* (2013.01); *C08F 20/44* (2013.01); *H01M 4/604* (2013.01); *C08F 2810/00* (2013.01); *H01M 2004/028* (2013.01)

(58) Field of Classification Search
None
See application file for complete search history.

(56) References Cited

U.S. PATENT DOCUMENTS

2018/0013147 A1     1/2018   Cho et al.

FOREIGN PATENT DOCUMENTS

CN       102160217       8/2011
CN       102863574       1/2013
(Continued)

OTHER PUBLICATIONS

KR850004364 English translation. Riyudeijie et al. Korea. Jul. 11, 1985. (Year: 1985).*
(Continued)

*Primary Examiner* — Christopher P Domone
(74) *Attorney, Agent, or Firm* — JCIPRNET

(57) ABSTRACT

A high-conductivity sulfur-based positive electrode material for a secondary battery and a secondary battery are provided. The sulfur-based positive electrode material is formed by evenly mixing highly isotactic polyacrylonitrile as a precursor with elemental sulfur and then heating to undergo a chemical reaction. The highly isotactic polyacrylonitrile is synthesized from an acrylonitrile monomer by means of a free radical polymerization or inclusion polymerization reaction under the action of a template agent.

9 Claims, 4 Drawing Sheets

(51) Int. Cl.
  *H01M 4/02* (2006.01)
  *H01M 4/60* (2006.01)

(56) References Cited

FOREIGN PATENT DOCUMENTS

| | | | |
|---|---|---|---|
| CN | 103794764 | | 5/2014 |
| CN | 104334613 | | 2/2015 |
| CN | 104350072 | | 2/2015 |
| CN | 113809315 | | 12/2021 |
| JP | 2006036908 | | 2/2006 |
| JP | 2014506389 | | 3/2014 |
| JP | 2018516443 | | 6/2018 |
| KR | 850004364 | * | 7/1985 |

OTHER PUBLICATIONS

Chen-Jui Huang et al., "Origin of shuttle-free sulfurized polyacrylonitrile in lithium-sulfur batteries", Journal of Power Sources, Feb. 28, 2021, pp. 1-11.

Zhao Hai-Peng et al., "The Pyrolytic Characteristic of Polyacrylonitrile and Its Application in Lithium Ion Batteries", Polymer Materials Science and Engineering, with English abstract, Nov. 30, 2007, pp. 1-5.

Jiulin Wang et al., "A Novel Conductive Polymer-Sulfur Composite Cathode Material for Rechargeable Lithium Batteries", Advanced Materials, Jul. 1, 2002, pp. 963-965.

"International Search Report (Form PCT/ISA/210) of PCT/CN2022/078703," mailed on May 25, 2022, with English translation thereof, pp. 1-6.

"Office Action of Japan Counterpart Application", issued on May 16, 2025, p. 1-p. 4.

* cited by examiner

HIGH-CONDUCTIVITY SULFUR-BASED POSITIVE ELECTRODE MATERIAL FOR SECONDARY BATTERY AND SECONDARY BATTERY

CROSS-REFERENCE TO RELATED APPLICATION

This application is a 371 of international application of PCT application serial no. PCT/CN2022/078703, filed on Mar. 2, 2022, which claims the priority benefit of China application no. 202111081775.2, filed on Sep. 15, 2021. The entirety of each of the above mentioned patent applications is hereby incorporated by reference herein and made a part of this specification.

TECHNICAL FIELD

The present invention relates to a sulfur-based positive electrode material, and in particular to a high-conductivity sulfur-based positive electrode material for a secondary battery. The secondary battery is a lithium-sulfur battery, a sodium-sulfur battery, a potassium-sulfur battery, a magnesium-sulfur battery, a calcium-sulfur battery and an aluminum-sulfur battery assembled by the sulfur-based positive electrode material.

DESCRIPTION OF RELATED ART

A secondary battery taking lithium, sodium, potassium, magnesium or aluminum as a negative electrode and sulfur as a positive electrode has the significant advantages of high energy density, an abundant sulfur resources, low cost, environmental optimization and the like. Taking a lithium-sulfur battery as an example, due to the theoretical energy density as high as 2600 Wh/kg and the characteristics of low cost and environmental friendliness, the lithium-sulfur battery has received extensive attention. However, due to the insulativity of the sulfur, the actual capacity is quite different from the theoretical value. To make the sulfur positive electrode work normally, it is necessary to add a large number of conductive agents during preparation of the positive electrode, resulting in the decrease of the overall specific capacity of the material. In addition, during the cycle of the sulfur positive electrode, an intermediate product lithium polysulfide is dissolved in electrolyte, resulting in "shuttle effect", thereby causing a further loss of active materials.

As early as 2002, it was reported for the first time that sulfur and polyacrylonitrile (PAN) were subjected to a chemical reaction (J. Wang, et al., Advanced materials, 2002, 13-14, 963) to prepare vulcanized polyacrylonitrile (sulfur-based cathode material S@pPAN). The positive electrode material has no polysulfide ion dissolution and shuttling phenomenon in a carbonate-based electrolyte, high charge and discharge efficiency and low self-discharge. However, when the traditional atactic polyacrylonitrile is used as the precursor, the obtained S@pPAN positive electrode material has low conductivity, about the order of magnitude $10^{-7}$-$10^{-4}$ S/cm, resulting in low cycle stability and rate performance of the material and affecting the use of the secondary battery.

Chinese patent CN104350072A discloses a method for preparing a polyacrylonitrile-sulfur-composite material. A polyacrylonitrile-sulfur-composite material with a $sp^2$-hybridization ratio greater than or equal to 85% based on all carbon atoms is used as an electrode active material, so that the inherent conductivity can be improved, low ohmic resistance is formed, the charge and discharge rates can be increased, the stable capacity is achieved, and the sulfur utilization rate is increased.

Chinese patent CN104334613A discloses a method for preparing a polyacrylonitrile-sulfur-composite material. By pre-adding matrix materials and real reactants, the agglomeration of polyacrylonitrile-particles can be prevented, and the composite material particles can be uniformly distributed. By the method, a polyacrylonitrile-sulfur-composite material with excellent electrochemical cycle stability and high discharge rate can be prepared.

BRIEF SUMMARY OF THE INVENTION

After research, the applicant of the present invention found that although the two Chinese patents CN104350072A and CN104334613A have improved the performance of the prepared materials to a certain extent, they were all realized by improving the sintering process or adding conductive substances, and did not start from the structure of polyacrylonitrile.

Therefore, it is of great significance to improve the cycle stability and rate performance of the secondary battery by preparing the S@pPAN positive electrode material with high conductivity without adding other materials.

The present invention starts from the structure of PAN, and by controlling the polymerization process of acrylonitrile monomers, polyacrylonitrile with a high isotactic ratio is prepared and has high cyclization degree when chemically reacting with sulfur, thus greatly improving the electrical conductivity of the composite material and achieving excellent electrochemical performance. Furthermore, the process is simple and the effect is remarkable.

An objective of the present invention is to provide a high-conductivity sulfur-based positive electrode material for a secondary battery, and the secondary battery, thereby significantly improving the overall electrical conductivity of the material, the active material utilization rate of the sulfur positive electrode, the cycle stability and the rate performance.

The objectives of the present invention are achieved by the following technical solutions:

a first aspect of the present invention provides a high-conductivity sulfur-based positive electrode material for a secondary battery. The high-conductivity sulfur-based positive electrode material is formed by mixing highly isotactic polyacrylonitrile as a precursor with elemental sulfur and performing a heating chemical reaction.

Preferably, the highly isotactic polyacrylonitrile is synthesized from an acrylonitrile monomer by means of inclusion polymerization or a free radical polymerization reaction under the action of a template agent.

Preferably, the highly isotactic polyacrylonitrile is polyacrylonitrile with an isotactic ratio (isotactic mm content) of 40-99%. The polyacrylonitrile with an isotactic ratio of 40-60% is prepared through free radical polymerization under the action of the template agent, and the polyacrylonitrile with an isotactic ratio of 60-99% is prepared an inclusion polymerization reaction.

Further preferably, the highly isotactic polyacrylonitrile is polyacrylonitrile with an isotactic ratio of 50-90%.

Preferably, the free radical polymerization reaction includes the following steps: mixing an acrylonitrile monomer, an initiator and a template agent, stirring the mixture at room temperature for 0.5-5 h, heating to 50° C.-100° C. and performing polymerization for 2-24 h to obtain the highly isotactic polyacrylonitrile. Further preferably, a mass ratio of the acrylonitrile monomer to the initiator to the template agent is 1:(0.01-0.1):(10-50); the template agent is selected from one or more of $MgCl_2$, $FeCl_3$, $CoCl_2$, $NiCl_2$ and $MgBr_2$; and the initiator is selected from one or more of potassium persulfate, sodium persulfate, ammonium persulfate, azodiisobutyronitrile and benzamide.

Preferably, the inclusion polymerization reaction process includes the following steps: freezing an acrylonitrile/urea inclusion compound at −60° C. for 3-40 days; initiating a reaction at a liquid nitrogen temperature by high-energy ray irradiation; and heating to −60° C.-100° C. after irradiation and performing a chain propagation reaction; and after performing the reaction for 2-48 h, terminating the reaction with water or methanol to obtain a polymer. Further preferably, a high-energy ray used in the irradiation reaction is one of β, γ and X rays.

Preferably, a mass ratio of the elemental sulfur to the highly isotactic polyacrylonitrile is (2-16):1.

Preferably, the conditions of the heating chemical reaction are: heating to 250° C.-450° C. and performing heat preservation for 1-16 h.

In the present invention, the heating chemical reaction may be performed under the presence of an additional protective gas, and the protective gas may be nitrogen or argon. The heating chemical reaction may also be performed without an additional protective gas. In this case, $H_2S$ produced during the reaction plays a protective role.

Preferably, in the sulfur-based positive electrode material for the secondary battery, the sulfur content is 35-70 wt %, further preferably, the sulfur content is 40-60 wt %.

A second aspect of the present invention is to provide a secondary battery, including a high-conductivity sulfur-based positive electrode material for the secondary battery.

Preferably, a negative electrode of the secondary battery is lithium, sodium, potassium, magnesium, calcium or aluminum. The corresponding secondary battery is a lithium-sulfur battery, a sodium-sulfur battery, a potassium-sulfur battery, a magnesium-sulfur battery, a calcium-sulfur battery and an aluminum-sulfur battery respectively assembled by the sulfur-based positive electrode material.

A third aspect of the present invention is to provide a sulfur positive electrode of a secondary battery. The sulfur positive electrode of the secondary battery is obtained by uniformly dispersing an adhesive, a high-conductivity sulfur-based positive electrode material for the secondary battery and a conductive agent according to a mass ratio (7-9):(0.5-1.5):(0.5-1.5) into a solvent, coating on a current collector, drying and tabletting.

Preferably, the solvent includes one of $H_2O$, DMF and NMP.

Compared with the prior art, the present invention has the following beneficial effects:

in the sulfur-based positive electrode material S@pPAN prepared from the atactic polyacrylonitrile as the precursor, the electronic conductivity at normal temperature is only the order of magnitude $10^{-7}$ to $10^{-4}$ S/cm, thereby affecting the cycle performance and rate performance of the material. The present invention starts from the polyacrylonitrile precursor to construct highly isotactic polyacrylonitrile (the isotactic ratio is not less than 40%, preferably, the highly isotactic polyacrylonitrile is 50-90%). This type of PAN has low thermal cracking and cyclization reaction temperatures, high crystallinity and regular shape, so that the thermal cracking and cyclization reaction temperatures are higher than those of the traditional PAN at the same temperature, the overall electrical conductivity of the material can be improved, the active material utilization rate of the sulfur positive electrode can be increased, and the cycle stability and the rate performance can be significantly improved. The electrical conductivity of the S@pPAN prepared by the present invention can reach $10^{-3}$ S/cm, and the reversible specific capacity of the sulfur-based positive electrode material with the sulfur content being about 45 wt % reaches 700 mAh/g. Significant effect, simple process, easy enlargement and high practicability are achieved.

DETAILED DESCRIPTION OF THE INVENTION

Figure 1:
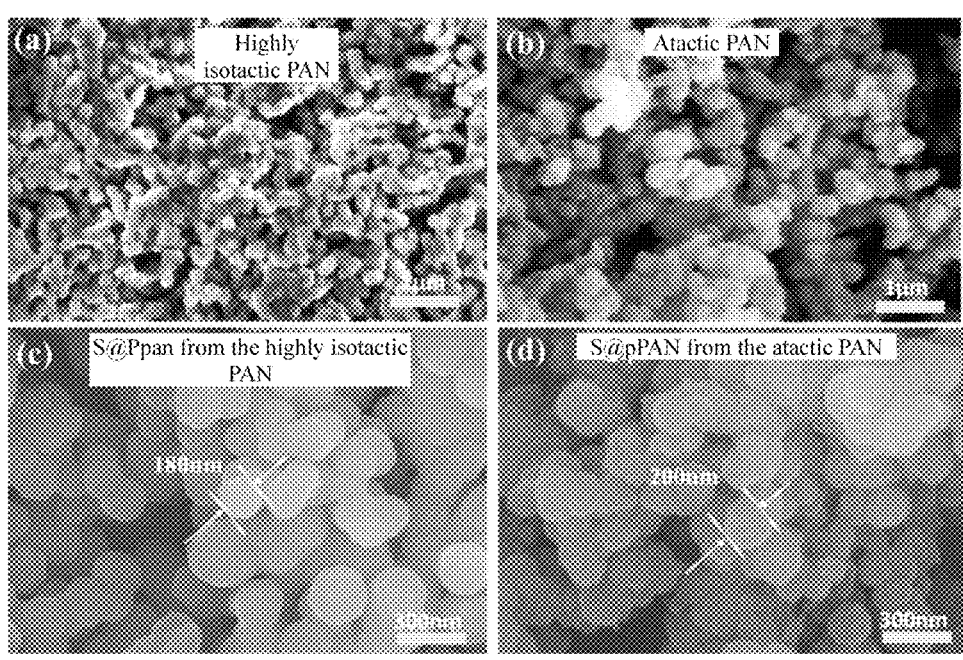
FIG. 1 is a transmission electron microscopy image of highly isotactic polyacrylonitrile (a), atactic polyacrylonitrile (b), a corresponding sulfur-based positive electrode material S@pPAN (c) prepared from the highly isotactic polyacrylonitrile as a precursor, and a corresponding sulfur-based positive electrode material S@pPAN (d) prepared from the atactic polyacrylonitrile as a precursor in Embodiment 1 and Comparative Example 1.

A high-conductivity sulfur-based positive electrode material for a secondary battery is formed by mixing highly isotactic polyacrylonitrile as a precursor with elemental sulfur and performing a heating chemical reaction.

In some embodiments, the highly isotactic polyacrylonitrile is synthesized from an acrylonitrile monomer by means of inclusion polymerization or a free radical polymerization reaction under the reaction of a template agent. In some embodiments, the highly isotactic polyacrylonitrile is polyacrylonitrile with an isotactic ratio (isotactic mm content) of 40-99%. The polyacrylonitrile with an isotactic ratio of 40-60% is prepared through free radical polymerization under the action of the template agent, and the polyacrylonitrile with an isotactic ratio of 60-99% is prepared an inclusion polymerization reaction. Preferably, the highly isotactic polyacrylonitrile is polyacrylonitrile with an isotactic ratio of 50-90%.

In some embodiments, the free radical polymerization reaction includes the following steps: mixing an acrylonitrile monomer, an initiator and a template agent, stirring the mixture at room temperature for 0.5-5 h, heating to 50° C.-100° C. and performing polymerization for 2-24 h to obtain the highly isotactic polyacrylonitrile. Preferably, a mass ratio of the acrylonitrile monomer to the initiator to the template agent is 1:(0.01-0.1):(10-50); the template agent may be selected from one or more of $MgCl_2$, $FeCl_3$, $CoCl_2$, $NiCl_2$ and $MgBr_2$; and the initiator may be selected from one or more of potassium persulfate, sodium persulfate, ammonium persulfate, azodiisobutyronitrile and benzamide.

In some embodiments, the inclusion polymerization reaction process includes the following steps: freezing an acrylonitrile/urea inclusion compound at –60° C. for 3-40 days; initiating a reaction at a liquid nitrogen temperature by high-energy ray irradiation; and heating to –60° C.-100° C. after irradiation and performing a chain propagation reaction; and after performing the reaction for 2-48 h, terminating the reaction with water or methanol to obtain a polymer. Preferably, a high-energy ray used in the irradiation reaction is one of β, γ and X rays.

In some embodiments, a mass ratio of the elemental sulfur to the highly isotactic polyacrylonitrile is (2-16):1.

In some embodiments, the conditions of the heating chemical reaction are: heating to 250° C.-450° C. and performing heat preservation for 1-16 h.

In the present invention, the heating chemical reaction may be performed under the presence of an additional protective gas, and the protective gas may be nitrogen or argon. The heating chemical reaction may also be performed without an additional protective gas. In this case, $H_2S$ produced during the reaction plays a protective role.

In some embodiments, in the sulfur-based material for the secondary battery, the sulfur content is 35-70 wt %, preferably, the sulfur content is 40-60 wt %.

A secondary battery includes a high-conductivity sulfur-based positive electrode material for the secondary battery.

In the present invention, a negative electrode of the secondary battery may be lithium, sodium, potassium, magnesium, calcium or aluminum. The corresponding secondary battery is a lithium-sulfur battery, a sodium-sulfur battery, a potassium-sulfur battery, a magnesium-sulfur battery, a calcium-sulfur battery and an aluminum-sulfur battery respectively assembled by the sulfur-based positive electrode material.

In the present invention, the sulfur positive electrode of the secondary battery may be obtained by uniformly dispersing an adhesive, a high-conductivity sulfur-based positive electrode material for the secondary battery and a conductive agent according to a mass ratio (7-9):(0.5-1.5):(0.5-1.5) into a solvent, coating on a current collector, drying and tabletting.

In some embodiments, the solvent includes one of $H_2O$, DMF and NMP.

The present invention is described in detail below with reference to the accompanying drawings and specific examples.

Comparative Example 1

6 ml of acrylonitrile monomer was added into 30 ml of mixed solution of water and DMSO (the volume ratio of water to DMSO is 4:1). 0.1 g of AIBN was added into the system to serve as an initiator, and nitrogen was introduced to discharge the air inside. After the system was heated to 70° C., reaction was performed for 12 h under magnetic stirring to obtain a white powdered precipitate. The white precipitate was washed alternately with methanol and water, and then the obtained white powder was placed in a vacuum oven and dried for 24 h to obtain atactic polyacrylonitrile.

2 g of the obtained atactic polyacrylonitrile and 16 g of elemental sulfur were added into ethanol for ball milling for 3 h, and powder obtained after drying was heated in a tubular furnace for 5 h at 300° C. in a nitrogen atmosphere to obtain a sulfur-based positive electrode material S@pPAN, where the sulfur content of the material is 45.19 wt %, and the electronic conductivity of the material is $3.2 \times 10^{-7}$ S/cm.

Figure 2:
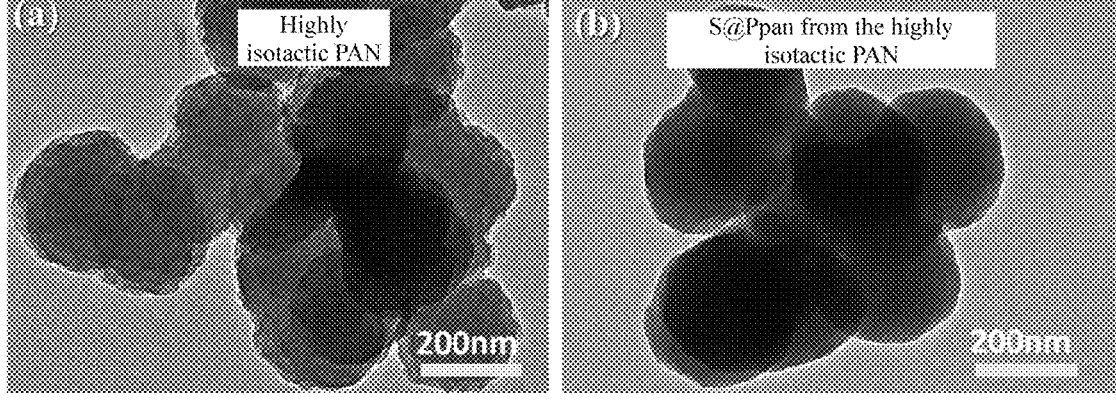
FIG. 2 is a transmission electron microscopy image of highly isotactic polyacrylonitrile (a) and a corresponding sulfur-based positive electrode material S@pPAN (b) prepared from the highly isotactic polyacrylonitrile as a precursor in Embodiment 1.
Figure 3:
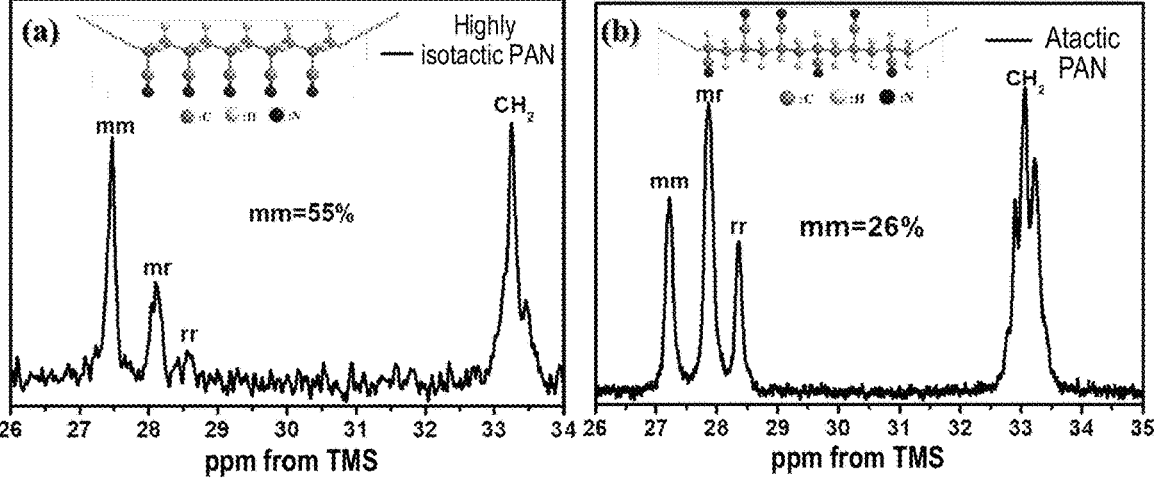
FIG. 3 is a carbon nuclear magnetic spectrum of highly isotactic polyacrylonitrile (a) and atactic polyacrylonitrile (b) obtained in Embodiment 1.

For the prepared atactic polyacrylonitrile, through comparison between the SEM and TEM diagrams in FIG. 1 and FIG. 2 and the highly isotactic polyacrylonitrile prepared in the present invention, it is found that the highly isotactic polyacrylonitrile has more uniform particle size distribution, better degree of sphericity and smoother surface. As shown in FIG. 3, through NMR test, the isotactic ratio of the atactic polyacrylonitrile is 26%, and the isotactic ratio of the highly isotactic polyacrylonitrile prepared in Embodiment 2 is up to 55%.

Figure 8:
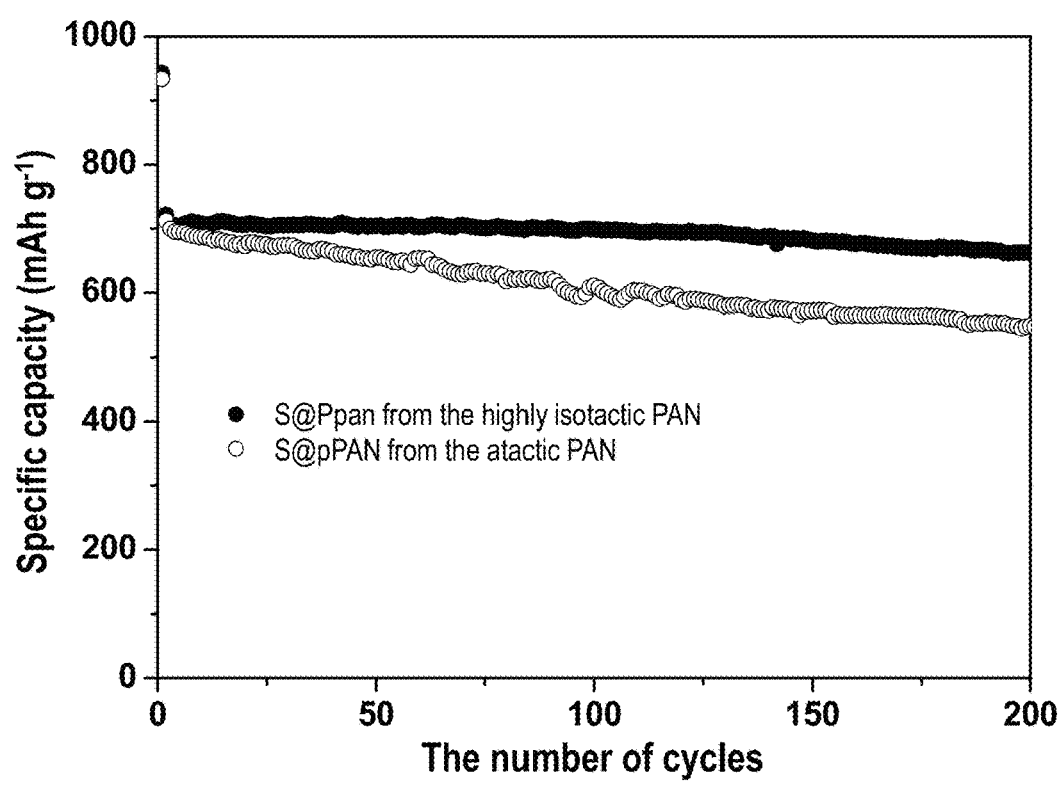
FIG. 8 is a cycle comparative diagram of a sulfur-based positive electrode material S@pPAN respectively prepared from highly isotactic polyacrylonitrile and atactic polyacrylonitrile obtained in Embodiment 2 as precursors.

Battery assembly and test are as follows: the sulfur-based positive electrode material obtained in Comparative Example 1 is made into a sulfur positive electrode, and metal lithium is used as a negative electrode to assemble a lithium-sulfur secondary battery. Electrolyte is 1 M of $LiPF_6$/EC: DMC (1:1 volume ratio, EC: ethylene carbonate, DMC: dimethyl carbonate), and the charge and discharge cut-off voltage is 1-3V (vs. $Li^+$/Li). Referring to FIG. 8, under the condition of 0.2 C rate, the first reversible specific capacity is 712 mAh/g. After 200 cycles, the specific capacity is 547 mAh/g, and the capacity retention ratio is 76.8%.

Embodiment 1

30 g of anhydrous $CoCl_2$ was added into a three-necked flask and was cooled in ice water for 30 min, and then the flask was filled with argon. Then 7 g of acrylonitrile monomer and 0.15 g of AIBN initiator were added and subjected to magnetic stirring for 4 h, polymerization reaction was started at 60° C., after 6-hour reaction, washing was performed alternately with methanol and water, and the obtained white powder was placed into a vacuum oven and dried for 24 h to obtain the highly isotactic polyacrylonitrile (the isotactic ratio is 55%).

FIG. 1 and FIG. 2 are the SEM and TEM diagrams of the highly isotactic polyacrylonitrile prepared in this embodiment and the positive electrode material, as well as the atactic polyacrylonitrile in Comparative Example 1 and the sulfur-based positive electrode material S@pPAN. It can be found that the highly isotactic polyacrylonitrile has more uniform particle size distribution, better degree of sphericity and smoother surface.

As shown in FIG. 3, the isotactic ratio of the highly isotactic polyacrylonitrile reaches 55%, compared with the atactic polyacrylonitrile (26%) prepared in Comparative Example 1, the isotactic ratio (mm) is greatly increased.

2 g of the obtained highly isotactic polyacrylonitrile and 16 g of elemental sulfur were added into ethanol for ball milling for 3 h, powder obtained after drying was heated in a tubular furnace for 10 h at 300° C. in a nitrogen atmosphere to obtain a sulfur-based positive electrode material S@pPAN, where the sulfur content of the material is 41.1 wt %, and the electronic conductivity of the material is $1.2 \times 10^3$ S/cm.

Battery assembly and test are as follows: the sulfur-based positive electrode material obtained in Embodiment 1 is made into a sulfur positive electrode, and metal lithium is used as a negative electrode to assemble a lithium-sulfur secondary battery. Electrolyte is 1 M of $LiPF_6$/EC:DMC (1:1 volume ratio, EC: ethylene carbonate, DMC: dimethyl carbonate), and the charge and discharge cut-off voltage is 1-3V (vs. $Li^+$/Li). The first specific capacity under the condition of 0.2 C rate reaches 635 mAh/g.

Embodiment 2

30 g of anhydrous $CoCl_2$ was added into a three-necked flask and was cooled in ice water for 30 min, and then the flask was filled with argon. Then 7 g of acrylonitrile monomer and 0.15 g of AIBN initiator were added and subjected to magnetic stirring for 4 h, polymerization reaction was started at 70° C., after 6-hour reaction, washing was performed alternately with methanol and water, and the obtained white powder was placed into a vacuum oven and dried for 24 h to obtain the highly isotactic polyacrylonitrile (the isotactic ratio is 55%).

Figure 4:
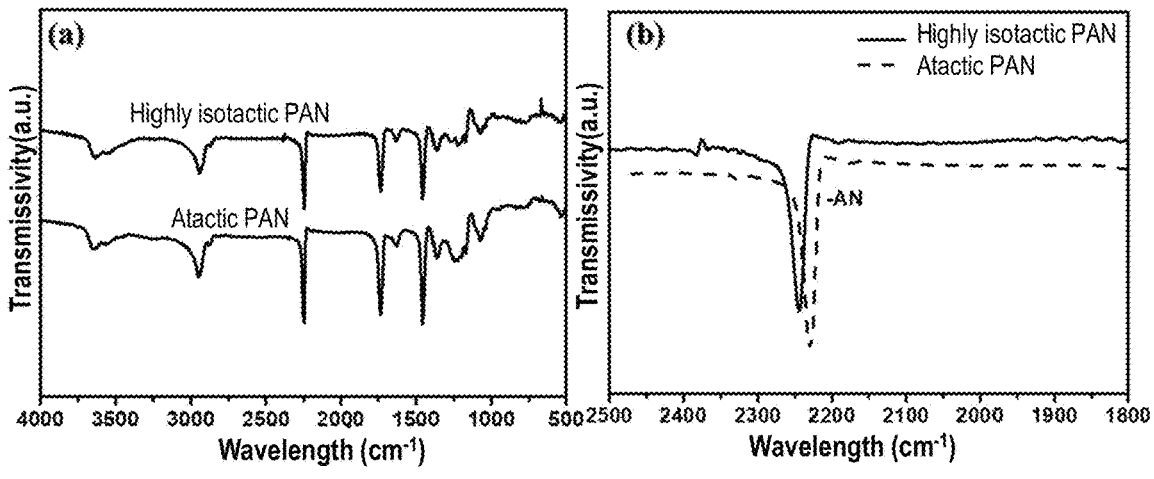
FIG. 4 is an infrared spectrum of highly isotactic polyacrylonitrile (a) and atactic polyacrylonitrile (b) obtained in Embodiment 2.
Figure 5:
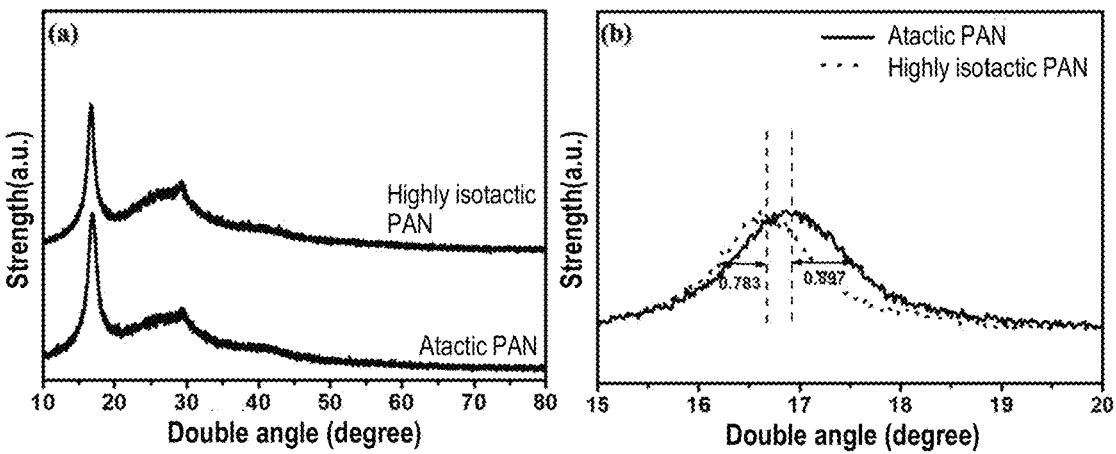
FIG. 5 is an XRD spectrum of highly isotactic polyacrylonitrile (a) and atactic polyacrylonitrile (b) obtained in Embodiment 2.

The isotactic ratio of the highly isotactic polyacrylonitrile is much higher than that of the atactic polyacrylonitrile, and the shape is more regular; therefore, the crystallinity is much higher than that of the atactic polyacrylonitrile, indicating that the corresponding group (−AN) and the characteristic peak of the material have shifted, as shown in FIG. 4 to FIG. 5.

Figure 6:
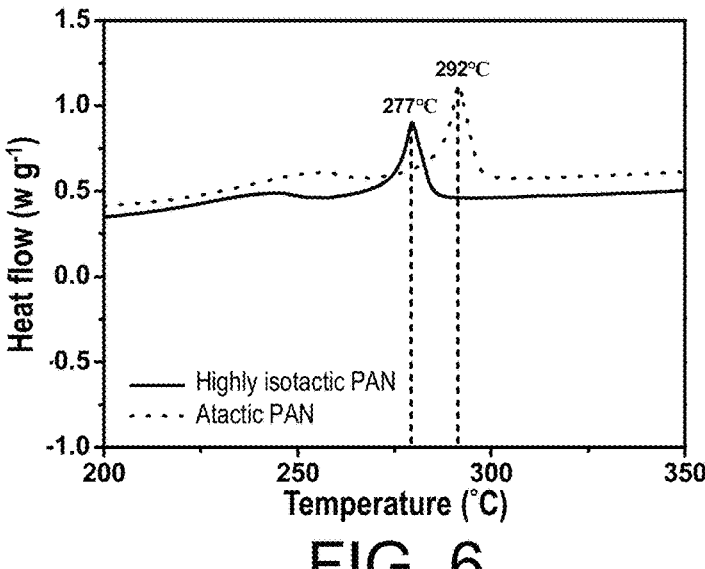
FIG. 6 is a DSC spectrum of highly isotactic polyacrylonitrile and atactic polyacrylonitrile obtained in Embodiment 2.
Figure 7:
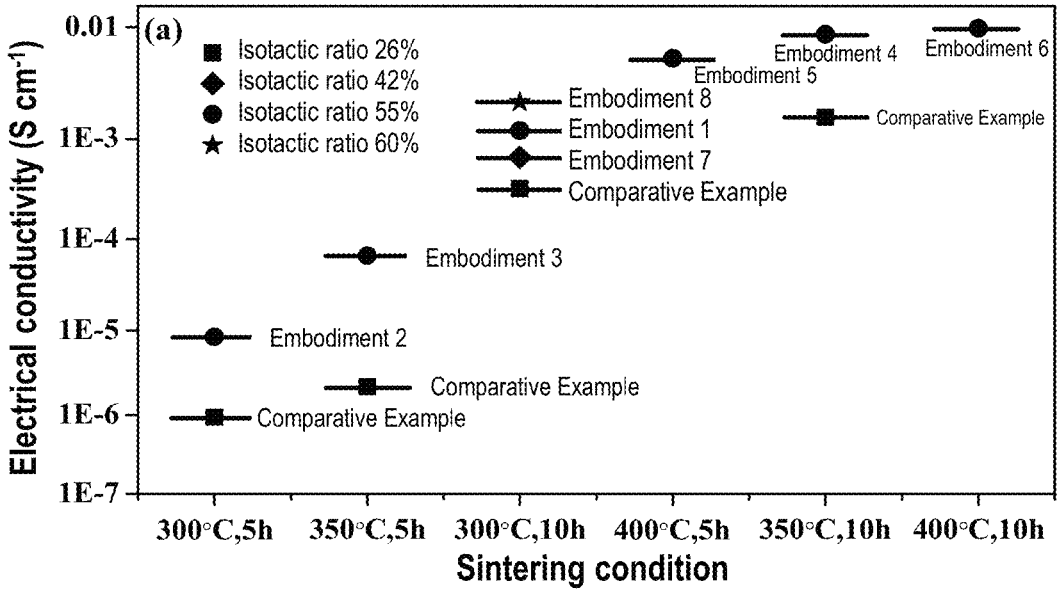
FIG. 7 is a comparative diagram of electrical conductivity of a sulfur-based positive electrode material S@pPAN prepared from highly isotactic polyacrylonitrile obtained in each embodiment as a precursor.
Figure 7:
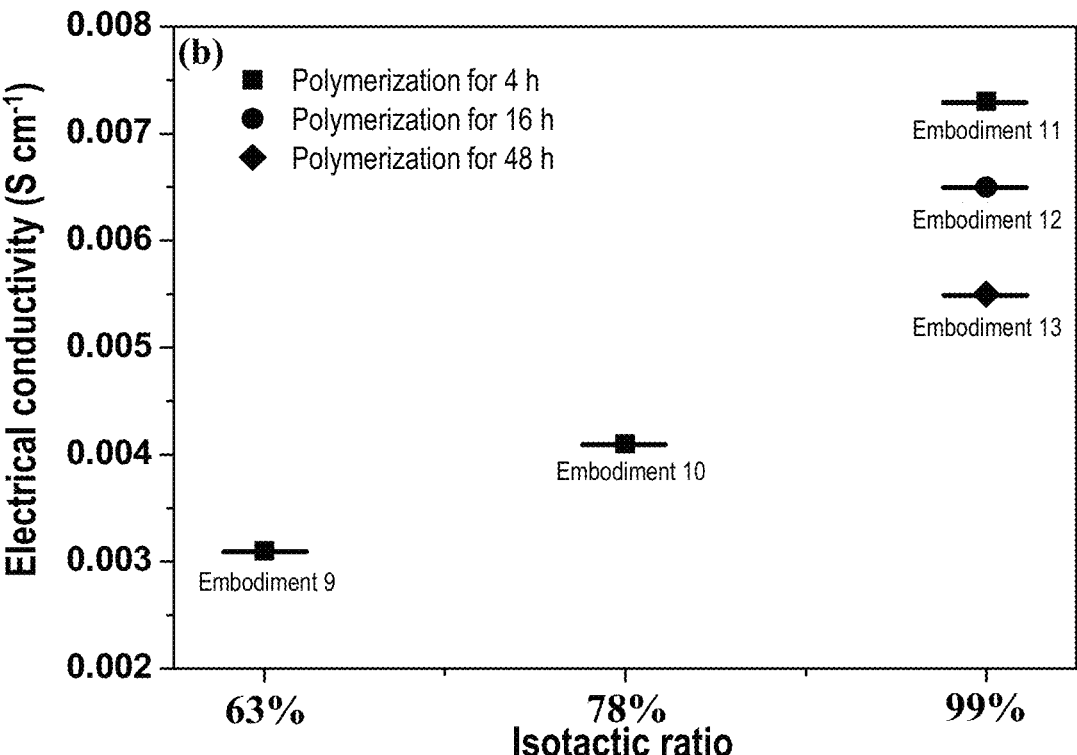

FIG. 6 is the analysis result of the DSC spectrum of the highly isotactic polyacrylonitrile prepared in this embodiment and the atactic polyacrylonitrile in Comparative Example 1. It can be observed that the highly isotactic polyacrylonitrile has suffered from dehydrocyclization reaction at about 277° C., and the cyclization reaction temperature of the atactic polyacrylonitrile is up to 292° C., indicating that the highly isotactic polyacrylonitrile is more prone to cyclization reaction and has higher degree of cyclization under the conditions of the same sintering temperature and time, and the electrical conductivity of the sulfur-based positive electrode material prepared accordingly is higher.

2 g of the prepared atactic polyacrylonitrile and 16 g of elemental sulfur were added into ethanol for ball milling for 3 h, and powder obtained after drying was heated in a tubular furnace for 5 h at 300° C. in a nitrogen atmosphere to obtain a sulfur-based positive electrode material S@pPAN, where the sulfur content of the material is 45.13 wt %, and the electronic conductivity of the material is $8.4 \times 10^{-6}$ S/cm.

Figure 9:
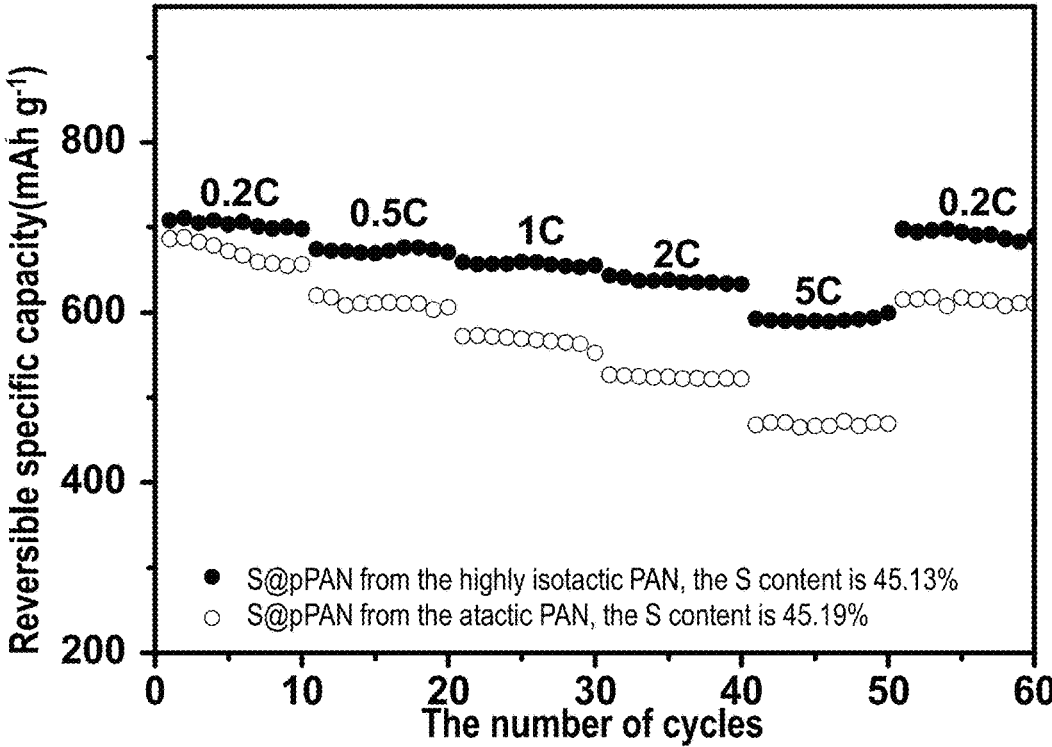
FIG. 9 is a rate comparative diagram of a sulfur-based positive electrode material S@pPAN respectively prepared from highly isotactic polyacrylonitrile and atactic polyacrylonitrile obtained in Embodiment 2 as precursors.

Battery assembly and test are as follows: the sulfur-based positive electrode material obtained in Embodiment 2 is made into a sulfur positive electrode, and metal lithium is used as a negative electrode to assemble a lithium-sulfur secondary battery. Electrolyte is 1 M of $LiPF_6$/EC:DMC (1:1 volume ratio, EC: ethylene carbonate, DMC: dimethyl carbonate), and the charge and discharge cut-off voltage is 1-3V (vs. $Li^+$/Li). Referring to FIG. 8, under the condition of 0.2 C rate, the first reversible specific capacity is 721 mAh/g. After 200 cycles, the specific capacity is 661 mAh/g, the capacity retention ratio is 91.7%, and the capacity retention ratio is greatly increased compared with Comparative Example 1. Referring to FIG. 9, under different rate conditions, the positive electrode material prepared in the embodiment and the positive electrode material prepared in Comparative Example 1 are subjected to rate performance test. It can be seen that with the increase of the rate, the rate performance of the positive electrode material prepared in this embodiment is more excellent than that of the positive electrode material in Comparative Example 1.

Embodiment 3

30 g of anhydrous $CoCl_2$ was added into a three-necked flask and was cooled in ice water for 30 min, and then the flask was filled with argon. Then 7 g of acrylonitrile monomer and 0.15 g of AIBN initiator were added and subjected to magnetic stirring for 4 h, polymerization reaction was started at 70° C., after 6-hour reaction, washing was performed alternately with methanol and water, and the obtained white powder was placed into a vacuum oven and dried for 24 h to obtain the highly isotactic polyacrylonitrile (the isotactic ratio is 55%).

2 g of the obtained highly isotactic polyacrylonitrile and 16 g of elemental sulfur were added into ethanol for ball milling for 3 h, powder obtained after drying was heated in a tubular furnace for 5 h at 350° C. in a nitrogen atmosphere to obtain a sulfur-based positive electrode material S@pPAN, where the sulfur content of the material is 40.20 wt %, and the electronic conductivity of the material is $6.7 \times 10^{-5}$ S/cm.

Battery assembly and test are as follows: the sulfur-based positive electrode material obtained in Embodiment 3 is made into a sulfur positive electrode, and metal lithium is used as a negative electrode to assemble a lithium-sulfur secondary battery. Electrolyte is 1 M of $LiPF_6$/EC:DMC (1:1 volume ratio, EC: ethylene carbonate, DMC: dimethyl carbonate), and the charge and discharge cut-off voltage is 1-3V (vs. $Li^+$/Li). The first reversible specific capacity under the condition of 0.2 C rate reaches 630 mAh/g.

Embodiment 4

30 g of anhydrous $CoCl_2$ was added into a three-necked flask and was cooled in ice water for 30 min, and then the flask was filled with argon. Then 7 g of acrylonitrile monomer and 0.15 g of AIBN initiator were added and subjected to magnetic stirring for 4 h, polymerization reaction was started at 70° C., after 6-hour reaction, washing was performed alternately with methanol and water, and the obtained white powder was placed into a vacuum oven and dried for 24 h to obtain the highly isotactic polyacrylonitrile (the isotactic ratio is 55%).

2 g of the obtained atactic polyacrylonitrile and 16 g of elemental sulfur were added into ethanol for ball milling for 3 h, and powder obtained after drying was heated in a tubular furnace for 10 h at 350° C. in a nitrogen atmosphere to obtain a sulfur-based positive electrode material S@pPAN, where the sulfur content of the material is 38.71 wt %, and the electrical conductivity is $8.7 \times 10^3$ S/cm.

Battery assembly and test are as follows: the sulfur-based positive electrode material obtained in Embodiment 4 is made into a sulfur positive electrode, and metal lithium is used as a negative electrode to assemble a lithium-sulfur secondary battery. Electrolyte is 1 M of $LiPF_6$/EC:DMC (1:1 volume ratio, EC: ethylene carbonate, DMC: dimethyl carbonate), and the charge and discharge cut-off voltage is 1-3V (vs. $Li^+$/Li). The first reversible specific capacity under the condition of 0.2 C rate reaches 600 mAh/g.

Embodiment 5

30 g of anhydrous $CoCl_2$ was added into a three-necked flask and was cooled in ice water for 30 min, and then the flask was filled with argon. Then 7 g of acrylonitrile monomer and 0.15 g of AIBN initiator were added and subjected to magnetic stirring for 4 h, polymerization reaction was started at 70° C., after 6-hour reaction, washing was performed alternately with methanol and water, and the obtained white powder was placed into a vacuum oven and dried for 24 h to obtain the highly isotactic polyacrylonitrile (the isotactic ratio is 55%).

2 g of the obtained atactic polyacrylonitrile and 16 g of elemental sulfur were added into ethanol for ball milling for 3 h, and powder obtained after drying was heated in a tubular furnace for 5 h at 400° C. in a nitrogen atmosphere to obtain a sulfur-based positive electrode material S@pPAN, where the sulfur content of the material is 39.78 wt %, and the electronic conductivity of the material is $5.4 \times 10^{-3}$ S/cm.

Battery assembly and test are as follows: the sulfur-based positive electrode material obtained in Embodiment 5 is made into a sulfur positive electrode, and metal lithium is used as a negative electrode to assemble a lithium-sulfur secondary battery. Electrolyte is 1 M of $LiPF_6$/EC:DMC (1:1 volume ratio, EC: ethylene carbonate, DMC: dimethyl carbonate), and the charge and discharge cut-off voltage is 1-3V (vs. $Li^+$/Li). The first reversible specific capacity under the condition of 0.2 C rate reaches 622 mAh/g.

Embodiment 6

30 g of anhydrous $CoCl_2$ was added into a three-necked flask and was cooled in ice water for 30 min, and then the flask was filled with argon. Then 7 g of acrylonitrile monomer and 0.15 g of AIBN initiator were added and subjected to magnetic stirring for 4 h, polymerization reaction was started at 70° C., after 6-hour reaction, washing was performed alternately with methanol and water, and the obtained white powder was placed into a vacuum oven and dried for 24 h to obtain the highly isotactic polyacrylonitrile (the isotactic ratio is 55%).

2 g of the obtained atactic polyacrylonitrile and 16 g of elemental sulfur were added into ethanol for ball milling for 3 h, and powder obtained after drying was heated in a tubular furnace for 10 h at 400° C. in a nitrogen atmosphere to obtain a sulfur-based positive electrode material S@pPAN, where the sulfur content of the material is 35.75 wt %, and the electronic conductivity of the material is $9.8 \times 10^{-3}$ S/cm.

Battery assembly and test are as follows: the sulfur-based positive electrode material obtained in Embodiment 6 is made into a sulfur positive electrode, and metal sodium is used as a negative electrode to assemble a sodium-sulfur secondary battery. Electrolyte is 1 M of $LiPF_6$/EC:DMC (1:1 volume ratio, EC: ethylene carbonate, DMC: dimethyl carbonate), and the charge and discharge cut-off voltage is 1-2.7V (vs. $Li^+$/Li). The first reversible specific capacity under the condition of 0.2 C rate reaches 554 mAh/g.

Embodiment 7

30 g of anhydrous $CoCl_2$ was added into a three-necked flask and was cooled in ice water for 20 min, and then the flask was filled with argon. Then 7 g of acrylonitrile monomer and 0.15 g of BPO initiator were added and subjected to magnetic stirring for 4 h, polymerization reaction was started Rear at 70° C., after 6-hour reaction, washing was performed alternately with methanol and water, and the obtained white powder was placed into a vacuum oven and dried for 24 h to obtain the highly isotactic polyacrylonitrile (the isotactic ratio is 42%).

2 g of the obtained atactic polyacrylonitrile and 16 g of elemental sulfur were added into ethanol for ball milling for 3 h, and powder obtained after drying was heated in a tubular furnace for 10 h at 300° C. in a nitrogen atmosphere to obtain a sulfur-based positive electrode material S@pPAN, where the sulfur content of the material is 42.16 wt %, and the electronic conductivity of the material is $6.7 \times 10^{-4}$ S/cm.

Battery assembly and test are as follows: the sulfur-based positive electrode material obtained in Embodiment 7 is made into a sulfur positive electrode, and metal lithium is used as a negative electrode to assemble a lithium-sulfur secondary battery. Electrolyte is 1 M of $LiPF_6$/EC:DMC (1:1 volume ratio, EC: ethylene carbonate, DMC: dimethyl carbonate), and the charge and discharge cut-off voltage is 1-3V (vs. $Li^+$/Li). The first reversible specific capacity under the condition of 0.2 C rate reaches 653 mAh/g.

Embodiment 8

30 g of anhydrous $NiCl_2$ was added into a three-necked flask and was cooled in ice water for 30 min, and then the flask was filled with argon. Then 7 g of acrylonitrile monomer and 0.15 g of AIBN initiator were added and subjected to magnetic stirring for 4 h, polymerization reaction was started at 70° C., after 6-hour reaction, washing was performed alternately with methanol and water, and the obtained white powder was placed into a vacuum oven and dried for 24 h to obtain the highly isotactic polyacrylonitrile (the isotactic ratio is 60%).

2 g of the obtained atactic polyacrylonitrile and 16 g of elemental sulfur were added into ethanol for ball milling for 3 h, and powder obtained after drying was heated in a tubular furnace for 10 h at 300° C. in a nitrogen atmosphere to obtain a sulfur-based positive electrode material S@pPAN, where the sulfur content of the material is 40.52 wt %, and the electronic conductivity of the material is $2.2 \times 10^3$ S/cm.

Battery assembly and test are as follows: the sulfur-based positive electrode material obtained in Embodiment 8 is made into a sulfur positive electrode, and metal lithium is used as a negative electrode to assemble a lithium-sulfur secondary battery. Electrolyte is 1 M of $LiPF_6$/EC:DMC (1:1 volume ratio, EC: ethylene carbonate, DMC: dimethyl carbonate), and the charge and discharge cut-off voltage is 1-3V (vs. $Li^+$/Li). The first reversible specific capacity under the condition of 0.2 C rate reaches 628 mAh/g.

Embodiment 9

10 g of acrylonitrile and 12 g of urea were uniformly mixed and frozen at −60° C. for 3 days to obtain an acrylonitrile/urea inclusion compound, then the prepared acrylonitrile/urea inclusion compound was cooled to a liquid nitrogen temperature and put into $^{60}Co\gamma$ rays of $2.0 \times 10^{15} Bq$ for irradiation (8 kGy×3 h). Then, the inclusion compound lefts X rays and was heated to −100° C. for a chain propagation reaction, cold methanol was added into the reaction system after 4 h to dissolve and remove urea and terminate the polymerization reaction, and after filtering, the residues were repeatedly washed with distilled water and methanol until the unreacted monomer and urea were completely removed. Finally, the polymer was subjected to vacuum drying to obtain white powdered highly isotactic polyacrylonitrile (the isotactic ratio is 63%).

2 g of the obtained atactic polyacrylonitrile and 16 g of elemental sulfur were added into ethanol for ball milling for 3 h, and powder obtained after drying was heated in a tubular furnace for 10 h at 300° C. in a nitrogen atmosphere to obtain a sulfur-based positive electrode material S@pPAN, where the sulfur content of the material is 42.51 wt %, and the electrical conductivity is $3.1×10^{-3}$ S/cm.

Battery assembly and test are as follows: the sulfur-based positive electrode material obtained in Embodiment 9 is made into a sulfur positive electrode, and metal lithium is used as a negative electrode to assemble a lithium-sulfur secondary battery. Electrolyte is 1 M of $LiPF_6$/EC:DMC (1:1 volume ratio, EC: ethylene carbonate, DMC: dimethyl carbonate), and the charge and discharge cut-off voltage is 1-3V (vs. $Li^+$/Li). The first reversible specific capacity under the condition of 0.2 C rate reaches 658 mAh/g.

The sulfur-based positive electrode material obtained in Embodiment 9 is made into a sulfur positive electrode, and metal magnesium is used as a negative electrode to assemble a magnesium-sulfur secondary battery. Electrolyte is 0.4 M of $(PhMgCl)_2$—$AlCl_3$/THF $((PhMgCl)_2$: phenylmagnesium chloride), and the charge and discharge cut-off voltage is 0.4-2.4V (vs. $Mg^{2+}$/Mg). The first reversible specific capacity under the condition of 0.1 C rate reaches 620 mAh/g.

Embodiment 10

10 g of acrylonitrile and 12 g of urea were uniformly mixed and frozen at −60° C. for 12 days to obtain an acrylonitrile/urea inclusion compound, then the prepared acrylonitrile/urea inclusion compound was cooled to a liquid nitrogen temperature and put into $^{60}Co\gamma$ rays of $2.0×10^{15}Bq$ for irradiation (8 kGy×3 h). Then, the inclusion compound lefts X rays and was heated to −100° C. for a chain propagation reaction, cold methanol was added into the reaction system after 4 h to dissolve and remove urea and terminate the polymerization reaction, and after filtering, the residues were repeatedly washed with distilled water and methanol until the unreacted monomer and urea were completely removed. Finally, the polymer was subjected to vacuum drying to obtain white powdered highly isotactic polyacrylonitrile (the isotactic ratio is 78%).

2 g of the obtained atactic polyacrylonitrile and 16 g of elemental sulfur were added into ethanol for ball milling for 3 h, and powder obtained after drying was heated in a tubular furnace for 10 h at 300° C. in a nitrogen atmosphere to obtain a sulfur-based positive electrode material S@pPAN, where the sulfur content of the material is 40.23 wt %, and the electrical conductivity is $4.1×10^3$ S/cm.

Battery assembly and test are as follows: the sulfur-based positive electrode material obtained in Embodiment 10 is made into a sulfur positive electrode, and metal lithium is used as a negative electrode to assemble a lithium-sulfur secondary battery. Electrolyte is 1 M of $LiPF_6$/EC:DMC (1:1 volume ratio, EC: ethylene carbonate, DMC: dimethyl carbonate), and the charge and discharge cut-off voltage is 1-3V (vs. $Li^+$/Li). The first reversible specific capacity under the condition of 0.2 C rate reaches 617 mAh/g.

The sulfur-based positive electrode material obtained in Embodiment 10 is made into a sulfur positive electrode, and metal calcium is used as a negative electrode to assemble a calcium-sulfur secondary battery. Electrolyte is 1 M of $Ca(ClO_4)_2$/DMSO (DMSO: dimethyl sulfoxide), and the charge and discharge cut-off voltage is 0.7-2.7V (vs. $Ca^{2+}$/ Ca). The first reversible specific capacity under the condition of 0.1 C rate reaches 605 mAh/g.

Embodiment 11

10 g of acrylonitrile and 12 g of urea were uniformly mixed and frozen at −60° C. for 28 days to obtain an acrylonitrile/urea inclusion compound, then the prepared acrylonitrile/urea inclusion compound was cooled to a liquid nitrogen temperature and put into $^{60}Co\gamma$ rays of $2.0×10^{15}Bq$ for irradiation (8 kGy×3 h). Then, the inclusion compound lefts X rays and was heated to −100° C. for a chain propagation reaction, cold methanol was added into the reaction system after 4 h to dissolve and remove urea and terminate the polymerization reaction, and after filtering, the residues were repeatedly washed with distilled water and methanol until the unreacted monomer and urea were completely removed. Finally, the polymer was subjected to vacuum drying to obtain white powdered highly isotactic polyacrylonitrile (the isotactic ratio is greater than 99%).

2 g of the obtained atactic polyacrylonitrile and 16 g of elemental sulfur were added into ethanol for ball milling for 3 h, and powder obtained after drying was heated in a tubular furnace for 10 h at 300° C. in a nitrogen atmosphere to obtain a sulfur-based positive electrode material S@pPAN, where the sulfur content of the material is 39.75 wt %, and the electrical conductivity is $7.3×10^{-3}$ S/cm.

Battery assembly and test are as follows: the sulfur-based positive electrode material obtained in Embodiment 11 is made into a sulfur positive electrode, and metal lithium is used as a negative electrode to assemble a lithium-sulfur secondary battery. Electrolyte is 1 M of $LiPF_6$/EC:DMC (1:1 volume ratio, EC: ethylene carbonate, DMC: dimethyl carbonate), and the charge and discharge cut-off voltage is 1-3V (vs. $Li^+$/Li). The first reversible specific capacity under the condition of 0.2 C rate reaches 607 mAh/g.

The sulfur-based positive electrode material obtained in Embodiment 11 is made into a sulfur positive electrode, and metal aluminum is used as a negative electrode to assemble an aluminum-sulfur secondary battery. Electrolyte is NMBPBr/$AlCl_3$ (1:1.3 molar ratio, NMBPBr: N-butyl-N-methyl-piperidinium bromide), and the charge and discharge cut-off voltage is 0.01-1.3V (vs. $Al^{3+}$/Al). The first reversible specific capacity under the condition of 0.2 C rate reaches 607 mAh/g.

Embodiment 12

10 g of acrylonitrile and 12 g of urea were uniformly mixed and frozen at −60° C. for 28 days to obtain an acrylonitrile/urea inclusion compound was cooled to a liquid nitrogen temperature and put into $^{60}Co\gamma$ rays of $2.0×10^{15}Bq$ for irradiation (8 kGy×3 h). Then, the inclusion compound lefts X rays and was heated to −100° C. for a chain propagation reaction, cold methanol was added into the reaction system after 16 h to dissolve and remove urea and terminate the polymerization reaction, and after filtering, the residues were repeatedly washed with distilled water and methanol until the unreacted monomer and urea were completely removed. Finally, the polymer was subjected to vacuum drying to obtain white powdered highly isotactic polyacrylonitrile (the isotactic ratio is greater than 99%).

2 g of the obtained atactic polyacrylonitrile and 16 g of elemental sulfur were added into ethanol for ball milling for 3 h, and powder obtained after drying was heated in a tubular furnace for 10 h at 300° C. in a nitrogen atmosphere to obtain a sulfur-based positive electrode material S@pPAN, where the sulfur content of the material is 41.76 wt %, and the electrical conductivity is $6.5×10^{-3}$ S/cm.

Battery assembly and test are as follows: the sulfur-based positive electrode material obtained in Embodiment 12 is made into a sulfur positive electrode, and metal lithium is used as a negative electrode to assemble a lithium-sulfur secondary battery. Electrolyte is 1 M of LiPF$_6$/EC:DMC (1:1 volume ratio, EC: ethylene carbonate, DMC: dimethyl carbonate), and the charge and discharge cut-off voltage is 1-3V (vs. Li$^+$/Li). The first reversible specific capacity under the condition of 0.2 C rate reaches 647 mAh/g.

The sulfur-based positive electrode material obtained in Embodiment 12 is made into a sulfur positive electrode, and metal sodium is used as a negative electrode to assemble a sodium-sulfur secondary battery. Electrolyte is 1 M of NaPF$_6$/EC:DMC (1:1 volume ratio, EC: ethylene carbonate, DMC: dimethyl carbonate), and the charge and discharge cut-off voltage is 0.7-2.7V (vs. Na$^+$/Li). The first reversible specific capacity under the condition of 0.1 C rate reaches 588 mAh/g.

Embodiment 13

10 g of acrylonitrile and 12 g of urea were uniformly mixed and frozen at −60° C. for 28 days to obtain an acrylonitrile/urea inclusion compound, then the prepared acrylonitrile/urea inclusion compound was cooled to a liquid nitrogen temperature and put into $^{60}$Coγ rays of 2.0×10$^{15}$Bq for irradiation (8 kGy×3 h). Then, the inclusion compound lefts X rays and was heated to −100° C. for a chain propagation reaction, cold methanol was added into the reaction system after 48 h to dissolve and remove urea and terminate the polymerization reaction, and after filtering, the residues were repeatedly washed with distilled water and methanol until the unreacted monomer and urea were completely removed. Finally, the polymer was subjected to vacuum drying to obtain white powdered highly isotactic polyacrylonitrile (the isotactic ratio is greater than 99%).

2 g of the obtained atactic polyacrylonitrile and 16 g of elemental sulfur were added into ethanol for ball milling for 3 h, and powder obtained after drying was heated in a tubular furnace for 10 h at 300° C. in a nitrogen atmosphere to obtain a sulfur-based positive electrode material S@pPAN, where the sulfur content of the material is 42.69 wt %, and the electrical conductivity is 5.5×10$^3$ S/cm.

Battery assembly and test are as follows: the sulfur-based positive electrode material obtained in Embodiment 13 is made into a sulfur positive electrode, and metal lithium is used as a negative electrode to assemble a lithium-sulfur secondary battery. Electrolyte is 1 M of LiPF$_6$/EC:DMC (1:1 volume ratio, EC: ethylene carbonate, DMC: dimethyl carbonate), and the charge and discharge cut-off voltage is 1-3V (vs. Li$^+$/Li). The first reversible specific capacity under the condition of 0.2 C rate reaches 661 mAh/g.

The sulfur-based positive electrode material obtained in Embodiment 13 is made into a sulfur positive electrode, and metal potassium is used as a negative electrode to assemble a potassium-sulfur secondary battery. Electrolyte is 1 M of KPF$_6$/EC:DMC (1:1 volume ratio, EC: ethylene carbonate, DMC: dimethyl carbonate), and the charge and discharge cut-off voltage is 0.9-2.9V (vs. K$^+$/Li). The first reversible specific capacity under the condition of 0.1 C rate reaches 560 mAh/g.

The above description of the embodiments is convenient for those of ordinary skill in the art to understand and use the present invention. Those skilled in the art obviously may easily make various modifications on these embodiments, and may apply the general principles described herein to other embodiments without creative effort. Therefore, the present invention is not limited to the above embodiments. The improvements and modifications made by those skilled in the art according to the disclosure of the present invention without departing from the scope of the present invention should be within the protection scope of the present invention.

What is claimed is:

1. A high-conductivity sulfur-based positive electrode material for a secondary battery, being formed by mixing highly isotactic polyacrylonitrile as a precursor with elementary sulfur and then heating to undergo a chemical reaction, wherein the highly isotactic polyacrylonitrile is polyacrylonitrile with an isotactic ratio of 40-99%.

2. The high-conductivity sulfur-based positive electrode material for a secondary battery according to claim 1, wherein the highly isotactic polyacrylonitrile is polyacrylonitrile with the isotactic ratio of 50-90%.

3. The high-conductivity sulfur-based positive electrode material for a secondary battery according to claim 1, wherein a mass ratio of the elemental sulfur and the highly isotactic polyacrylonitrile is (2-16):1.

4. The high-conductivity sulfur-based positive electrode material for a secondary battery according to claim 1, wherein a condition of heating to undergo the chemical reaction is: heating to 250° C.-450° C. and performing heat preservation for 1-16 h.

5. The high-conductivity sulfur-based positive electrode material for a secondary battery according to claim 1, wherein in the high-conductivity sulfur-based positive electrode material for the secondary battery, a sulfur content is 35-80 wt %.

6. The high-conductivity sulfur-based positive electrode material for a secondary battery according to claim 1, wherein a sulfur content is 40-70 wt %.

7. The high-conductivity sulfur-based positive electrode material for a secondary battery according to claim 1, wherein a protective gas of heating to undergo the chemical reaction is one of nitrogen and argon.

8. A secondary battery, comprising a positive electrode material and a negative electrode material, wherein the positive electrode material comprises the high-conductivity sulfur-based positive electrode material for a secondary battery according to claim 1.

9. The secondary battery according to claim 8, wherein the negative electrode material of the secondary battery is lithium, sodium, potassium, magnesium, calcium or aluminum.

* * * * *